Patented Dec. 8, 1953

2,662,015

UNITED STATES PATENT OFFICE 2,662,015

IMPROVED SHORTENING AND CAKE COMPOSITION

William C. Griffin, West Chester, Pa., assignor to Atlas Powder Company, Wilmington, Del., a corporation of Delaware No Drawing. Application April 2, 1949,
Serial No. 85,259

10 Claims. (Cl. 99—92)

This invention relates to improvements in the manufacture of cakes.

Cakes having a high proportion of sugar to flour possess a tendency to shrink while in the oven or soon after their removal from the oven if they contain more than 35 parts of shortening per 100 parts by weight of flour. This shrinkage is particularly severe in the case of cakes made with egg whites. Similar cakes made with whole eggs are also inclined to shrink, but to a lesser degree. In any case, however, cakes containing high proportions of sugar and shortening are generally too tender or unattractive in appearance to be salable.

Also, it is desirable that all cakes, regardless of their sugar and shortening content and of whether they are made with whole eggs, egg whites or egg yolks, should not possess a coarse cell structure, or coarse grain as it is called in the baking industry. A medium or fine grain is desired in most types of cakes.

The foregoing being in brief the state of the art, it is therefore the object of the present invention to provide a novel method for preventing shrinkage in cakes having high concentrations of sugar and shortening and to improve the grain of all types of cakes.

The foregoing and other objects are accomplished by incorporating, prior to baking, with the cake ingredients a polyoxyethylene compound of the generic formula $R(OCH_2CH_2)_nOR'$, where R and R' are acyl radicals of certain straight-chain, monocarboxylic acids having from 12 to 18 carbon atoms and $n$ is an integer from 15 to 35, or a mixture of such compounds. For example, R and R' may be the lauroyl, myristoyl, palmitoyl, stearoyl, oleoyl, ricinoleoyl, etc. radical. The polyoxyethylene compound can be introduced into the other cake ingredients by adding the compound to the dry ingredients, or to the batter containing both dry and liquid ingredients, or preferably by premixing the compound with part or all of the shortening (suitably by melting together) and adding the resulting mixture at any of the usual stages of the cake mixing operation.

For convenience in the examples the number of oxyethylene (—OCH$_2$CH$_2$—) groups in the polyoxyethylene compounds is indicated by a number preceding the name. Thus 30 polyoxyethylene stearate oleate refers to composition wherein the average value of $n$ in the generic formula is 30. The preferred polyoxyethylene compounds employed in this invention are prepared by the reaction of ethylene oxide and one of the fatty acids, thus forming a polyoxyethylene monoester of the selected acid, and the resulting monoester is subsequently esterified with fatty acid to form the diester. It will be understood that this method of preparation results in products which are mixtures of polyethylene esters of the selected acids with a wide distribution of polyoxyethylene chain lengths. The value of $n$ in a particular product represents the average chain length.

For a more complete understanding of the present invention there is included the following example, which is intended to be not limitative.

Example

In order to prepare a cake, the following ingredients were first mixed together for two minutes at low speed in a three-quart bowl: flour, 400 gms.; sugar, 420 gms.; hydrogenated vegetable oil containing 1% by weight of 30-polyoxyethylene stearate oleate, 220 gms.; non-fat milk solids, 56 gms.; salt, 8 gms.; baking powder, 22 gms.; water, 220 gms.

Eighty grams of water was gradually added to the foregoing mixture, and the entire mixture was then mixed for 7 minutes at moderate speed. Thereafter, 80 gms. of water and 240 gms. of egg whites were gradually added, and the entire mixture mixed for 5 minutes at moderate speed.

Twelve ounces of the batter was then baked in an 8-inch round pan for 21 minutes at 375° F. The cake thus prepared was one-third larger than a comparison cake baked with 220 gms. of hydrogenated vegetable oil not containing the 30-polyoxyethylene stearate oleate, and at the same time had a better appearance in shape and fineness of cell structure when compared with the comparision cake.

Various modifications may be made in the specific procedure described in the example. Thus, instead of using 1% of 30-polyoxyethylene stearate oleate in admixture with shortening there may be used 1/3 % of 16-polyoxyethylene stearate oleate and 2/3 % of 30-polyoxyethylene stearate oleate. In fact, in place of the 30-polyoxyethylene stearate oleate there may be used any compound falling within the generic formula $R(OCH_2CH_2)_nOR'$ in which R and R' are acyl radicals of straight-chain, monocarboxylic acids having from 12 to 18 carbon atoms, such acids being ricinoleic acid, unsubstituted saturated acids (e. g., lauric acid, myristic acid, palmitic acid, etc.) or unsubstituted unsaturated acids having one double bond (e. g., oleic acid), and in which $n$ is an integer from 15 to 35. Furthermore, the amount of di-ester used may be varied within a wide range, from about 0.5 to about 6% of di-ester, based upon the weight of the shortening, generally being used, and from about 0.5 to about 2.0% of di-ester, based upon the weight of the shortening, preferably being used. Also, the cake may be prepared using other conventional shortenings, such as lard, or butter.

As previously indicated the polyoxyethylene compound can be employed in several ways in practising this invention. A dry cake mix can readily be prepared as a valuable article of commerce by adding the polyoxyethylene compound to dry ingredients which are otherwise of conventional composition. For example a mixture can be prepared with flour, leavening agent, shortening, dry flavoring ingredients, dried egg substance, and from 0.5 to 6% of one or more of the polyoxyethylene compounds based on the weight of the shortening. The cake resulting from the addition of liquid to such a dry mix and baking shows the advantages of volume and texture characteristic of this invention.

Another product that can be made for use in practising the invention is a concentrate of the polyoxyethylene compound in shortening. Such a concentrate can contain up to 40% or even more of the polyoxyethylene compound. In use, a portion of the concentrate is added to the cake ingredient along with a sufficient quantity of unmixed shortening to bring the level down to the useful range of 0.5 to 6% polyoxyethylene compound based on total shortening. Some of the advantages of the concentrate are that it can be made under controlled conditions of high accuracy; the product can be creamed to have a physical consistency like conventional creamed shortenings; and the baker is handling a larger volume of lower strength material thus minimizing the effects of faulty measuring.

I claim:

1. A cake batter comprising shortening and from about 0.5 to about 6%, based upon the weight of the shortening of at least one compound of the generic formula $R(OCH_2CH_2)_nOR'$, in which R and R' are acyl radicals of straight-chain, monocarboxylic acids having from 12 to 18 carbon atoms, said acids being selected from the group consisting of ricinoleic acid, unsubstituted saturated acids and unsubstituted unsaturated acids having one carbon to carbon double bond, and $n$ is an integer from 15 to 35.

2. Composition as in claim 1, in which R is the stearoyl radical, R' is the oleoyl radical and $n$ is 30.

3. A cake batter comprising shortening and from about 0.5 to about 2.0%, based upon the weight of the shortening of at least one compound of the generic formula $R(OCH_2CH_2)_nOR'$, in which R and R' are acyl radicals of straight-chain, monocarboxylic acids having from 12 to 18 carbon atoms, said acids being selected from the group consisting of ricinoleic acid, unsubstituted saturated acids and unsubstituted unsaturated acids having one carbon to carbon double bond, and $n$ is an integer from 15 to 35.

4. Composition as in claim 3, in which R is the stearoyl radical, R' is the oleoyl radical and $n$ is 30.

5. A cake mix in dry form consisting of flour, shortening and the other dry ingredients of a cake formula, and from 0.5 to 6% by weight of the shortening of at least one compound of the generic formula $R(OCH_2CH_2)_nOR'$, in which R and R' are acyl radicals of straight-chain, monocarboxylic acids having from 12 to 18 carbon atoms, said acids being selected from the group consisting of ricinoleic acid, unsubstituted saturated acids and unsubstituted unsaturated acids having one carbon to carbon double bond, and $n$ is an integer from 15 to 35.

6. A composition of matter which consists essentially of shortening and from about 0.5 to about 40%, based upon the weight of the shortening, of at least one compound of the generic formula $R(OCH_2CH_2)_nOR'$, in which R and R' are acyl radicals of straight-chain, monocarboxylic acids having from 12 to 18 carbon atoms, said acids being selected from the group consisting of ricinoleic acid, unsubstituted saturated acids and unsubstituted unsaturated acids having one carbon to carbon double bond, and $n$ is an integer from 15 to 35.

7. A composition of matter which consists essentially of shortening and from about 0.5 to about 6%, based upon the weight of the shortening, of at least one compound of the generic formula $R(OCH_2CH_2)_nOR'$, in which R and R' are acyl radicals of straight-chain, monocarboxylic acids having from 12 to 18 carbon atoms, said acids being selected from the group consisting of ricinoleic acid, unsubstituted saturated acids and unsubstituted unsaturated acids having one carbon to carbon double bond, and $n$ is an integer from 15 to 35.

8. Composition as in claim 7, in which R is the stearoyl radical, R' is the oleoyl radical and $n$ is 30.

9. A composition of matter which consists essentially of shortening and from about 0.5 to about 2.0%, based upon the weight of the shortening, of at least one compound of the generic formula $R(OCH_2CH_2)_nOR'$, in which R and R' are acyl radicals of straight-chain, monocarboxylic acids having from 12 to 18 carbon atoms, said acids being selected from the group consisting of ricinoleic acid, unsubstituted saturated acids and unsubstituted unsaturated acids having one carbon to carbon double bond, and $n$ is an integer from 15 to 35.

10. Composition as in claim 9, in which R is the stearoyl radical, R' is the oleoyl radical and $n$ is 30.

WILLIAM C. GRIFFIN.

References Cited in the file of this patent

UNITED STATES PATENTS

| Number | Name | Date |
| --- | --- | --- |
| 2,132,395 | Coith | Oct. 11, 1938 |
| 2,132,436 | Reynolds | Oct. 11, 1938 |
| 2,422,486 | Johnston | June 17, 1947 |
| 2,508,393 | Jaeger | May 23, 1950 |

OTHER REFERENCES

Atlas Spans & Tweens: Atlas Powder Co., Indus. Chem. Dept., Wilmington, Del. (1945), pages 2 and 8.

Favor et al.: Cereal Chem. 24, September 1947, pages 346–355.